US006810783B1

(12) United States Patent
Larose

(10) Patent No.: US 6,810,783 B1
(45) Date of Patent: Nov. 2, 2004

(54) SAW TOOTH

(76) Inventor: Claude Larose, 122, 2e Rue Ouest, Macamic, Québec (CA), J0Z 2S0

( * ) Notice: Subject to any disclaimer, the term of this patent is extended or adjusted under 35 U.S.C. 154(b) by 0 days.

(21) Appl. No.: 09/285,305

(22) Filed: Feb. 22, 1998

Related U.S. Application Data

(63) Continuation-in-part of application No. 08/751,239, filed on Nov. 18, 1996, now abandoned.

(51) Int. Cl.[7] .............................................. B27B 33/12
(52) U.S. Cl. ............................ 83/840; 83/836; 83/838; 83/955; 144/4.1; 144/34.1
(58) Field of Search .......................... 83/840, 839, 955, 83/835, 836, 837, 841, 842, 838; 144/4.1, 34.1; 407/113, 6, 107

(56) References Cited

U.S. PATENT DOCUMENTS

| | | | | |
|---|---|---|---|---|
| 490,777 A | * | 1/1893 | Trethewey ................ 83/955 X |
| 1,361,851 A | * | 12/1920 | Hall ....................... 407/113 X |
| 1,449,513 A | * | 3/1923 | Jaeger ......................... 407/113 |
| 2,392,216 A | * | 1/1946 | Anania ................... 407/113 X |
| 2,870,523 A | * | 1/1959 | Richard ......................... 407/6 |
| 2,907,099 A | * | 10/1959 | Dow ...................... 407/113 X |
| 3,341,920 A | * | 9/1967 | Kelm ..................... 407/113 X |
| 3,701,187 A | * | 10/1972 | Erkfritz ................. 407/113 X |
| 3,708,843 A | * | 1/1973 | Erkfritz ................. 407/113 X |
| 3,759,625 A | * | 9/1973 | Iversen .................. 407/113 X |
| 3,762,005 A | * | 10/1973 | Erkfritz ....................... 407/113 |
| 3,780,409 A | * | 12/1973 | Bartoszevicz et al. .. 407/113 X |
| 3,813,747 A | * | 6/1974 | Hertel .................... 407/113 X |
| 3,945,289 A | * | 3/1976 | Baez Rios ................ 83/839 X |
| 4,180,355 A | * | 12/1979 | Nanini ........................ 407/113 |
| 4,189,264 A | * | 2/1980 | Kraemer ..................... 407/6 X |
| 4,258,763 A | * | 3/1981 | Figueredo et al. ......... 144/34.1 |
| 4,539,875 A | * | 9/1985 | Lee et al. ............... 407/113 X |
| 4,667,713 A | * | 5/1987 | Wright .................... 83/842 X |
| 4,682,916 A | * | 7/1987 | Briese ........................ 407/113 |
| 4,750,396 A | * | 6/1988 | Gaddis et al. ........... 83/840 X |
| 4,790,693 A | * | 12/1988 | Koblesky ................ 407/113 X |
| 4,906,145 A | * | 3/1990 | Oliver ..................... 83/955 X |
| 4,932,447 A | * | 6/1990 | Morin ....................... 144/34.1 |
| 4,934,879 A | * | 6/1990 | van Barneveld ........ 407/113 X |
| 5,085,112 A | * | 2/1992 | MacLennan ................. 83/840 |
| 5,183,089 A | * | 2/1993 | Norlander et al. ........ 83/842 X |
| 5,211,212 A | * | 5/1993 | Carlson et al. ........... 83/840 X |
| 5,261,306 A | * | 11/1993 | Morey et al. ................. 83/840 |
| 5,269,355 A | * | 12/1993 | Bowen ..................... 83/840 X |
| 5,348,065 A | * | 9/1994 | Meyer .................... 407/113 X |
| 5,377,731 A | * | 1/1995 | Wildey .................... 83/839 X |
| 5,477,754 A | * | 12/1995 | Herbon ................... 407/113 X |
| 5,529,440 A | * | 6/1996 | Schmidt .................... 407/113 |
| 5,743,314 A | * | 4/1998 | Puch ...................... 407/113 X |
| 6,074,137 A | * | 6/2000 | Betman et al. ............ 407/103 |
| 6,167,958 B1 | * | 1/2001 | Lynde .................... 407/113 X |

FOREIGN PATENT DOCUMENTS

| | | | | |
|---|---|---|---|---|
| DE | 2354481 | * | 5/1975 | ................ 83/840 |
| DE | 2743304 | * | 4/1979 | ................ 83/841 |
| DE | 3434714 | * | 4/1986 | ................ 83/835 |

* cited by examiner

Primary Examiner—Charles Goodman

(57) ABSTRACT

A saw tooth of generally parallelopiped shape having top and bottom surfaces, side surfaces and front and back surfaces. Each front and back surface has cutting edges at its top and bottom sides. The cutting edges on each surface are parallel to each other and are also parallel to the cutting edges on the other surface.

22 Claims, 3 Drawing Sheets

*Fig- 3B*  *Fig- 3C* though this cutting edge becomes dull, the bolt is loosened; the tooth is rotated, relative to the mounting block, to place the other cutting edge on the same surface in the outer, leading cutting position; and the bolt is tightened. When this second cutting edge becomes dull, the bolt is removed, the tooth is reversed to place a cutting edge on the other surface in the cutting position, and the bolt is replaced and tightened. When the third edge becomes dull, the bolt is loosened, the tooth is rotated to place the other and last unused cutting edge on the other surface in the cutting position, and the bolt is tightened.

SAW TOOTH

RELATED APPLICATIONS

This application is a C-I-P application of application Ser. No. 08/751,239, filed Nov. 18, 1996, now abandoned.

BACKGROUND OF THE INVENTION

1. Field of the Invention

This invention is directed toward an improved saw tooth for circular saws.

The invention is also directed toward an improved saw tooth assembly using the improved saw tooth.

2. Description of the Related Art Including Information Disclosed Under CFR §§1.97–1.99

The improved saw tooth of the present invention is of the type used in circular saws, the circular saws being used in tree harvesting equipment. The saw tooth is also of the type that can be replaced on the blade of the circular saw when it becomes dull.

Replacing the saw teeth when they become dull can be expensive. To reduce the expense of replacing the teeth it is known to provide a saw tooth having several cutting edges. When one cutting edge becomes dull, the saw tooth is merely repositioned on the saw blade to present an unused cutting edge in the cutting position. Thus one tooth can be used two, or preferably four times, before it needs to be replaced. Thus the expense of replacing teeth is greatly reduced. Examples of such saw teeth, with multiple cutting edges, are shown in U.S. Pat. No. 4,932,447, issued Jun. 12, 1990, Armand J. Morin inventor; U.S. Pat. No. 5,058,477, issued Oct. 22, 1991, Charles D. MacLennan inventor; and U.S. Pat. No. 5,205,199, issued Apr. 27, 1993, Charles D. MacLennan inventor, by way of example. The known cutting teeth with four cutting edges are relatively expensive however. They usually employ curved cutting edges, as shown in U.S. Pat. Nos. 4,932,447 and 5,058,477, and thus their manufacture is relatively expensive. Even when the known teeth employ straight cutting edges, as shown in U.S. Pat. No. 5,205,199, the tooth is still relatively expensive to manufacture since the surfaces of the tooth forming all the cutting edges are quite numerous and complex.

SUMMARY OF THE INVENTION

It is the purpose of the present invention to provide an improved cutting tooth of the type with two or more cutting edges which tooth is relatively simple in construction and relatively inexpensive to produce compared to the known cutting teeth. In accordance with the present invention, the improved cutting tooth is provided with straight cutting edges which are easier to produce compared to curved cutting teeth known in the prior art. In addition, the joining surfaces providing the cutting edges are fewer in number and simpler than the surfaces used in the prior art.

In accordance with the present invention the improved saw tooth is a block-like, or generally parallelopiped, member having two opposed surfaces with each end of each surface having a cutting edge. The cutting edges on each surface are parallel to each other and are also parallel to the cutting edges on the other surface. The member has a central mounting hole extending between the surfaces, the axis of the hole transverse to the cutting edges.

The tooth is mounted on a mounting block on the rim of a circular saw blade by a bolt extending through the mounting hole in a manner to have one of the cutting edges on one of the surfaces in an outer, leading, cutting position. When this cutting edge becomes dull, the bolt is loosened; the tooth is rotated, relative to the mounting block, to place the other cutting edge on the same surface in the outer, leading cutting position; and the bolt is tightened. When this second cutting edge becomes dull, the bolt is removed, the tooth is reversed to place a cutting edge on the other surface in the cutting position, and the bolt is replaced and tightened. When the third edge becomes dull, the bolt is loosened, the tooth is rotated to place the other and last unused cutting edge on the other surface in the cutting position, and the bolt is tightened.

The invention is particularly directed toward a saw tooth having top and bottom surfaces; side surfaces; and front and back surfaces. Each front and back surface join the top and bottom surfaces at four parallel edge locations. Cutting edges are provided at at least two of these edge locations by having the front/back surfaces at these edge locations extend inwardly from the edge locations toward the other of the front/back surfaces. The cutting edges are parallel to each other.

The invention is also particularly directed toward a saw tooth assembly having; a saw tooth with top and bottom surfaces; side surfaces; and front and back surfaces. The front and back surfaces join the top and bottom surfaces at four parallel edge locations. Cutting edges are provided at at least two of these edge locations by having the front/back surfaces at these edge locations extend inwardly from the edge locations toward the other of the front/back surfaces. The cutting edges are parallel to each other. The assembly includes a mounting block adapted to mounted on the rim of a circular saw blade. Cooperating mounting surfaces on the mounting block and on the front and back surfaces of the saw tooth locate any one of the four cutting edges in cutting position when the saw tooth is detachably mounted on the block. A bolt detachably connects the tooth to the block with the mounting surface on the block abutting one of the mounting surfaces on the front or back surfaces of the tooth.

BRIEF DESCRIPTION OF THE DRAWINGS

FIGS. 3A, 3B, and 3C are detail side views of the saw tooth assembly showing repositioning of the saw tooth on the mounting block to provide new cutting edges;

DESCRIPTION OF THE PREFERRED EMBODIMENTS

Figure 1:
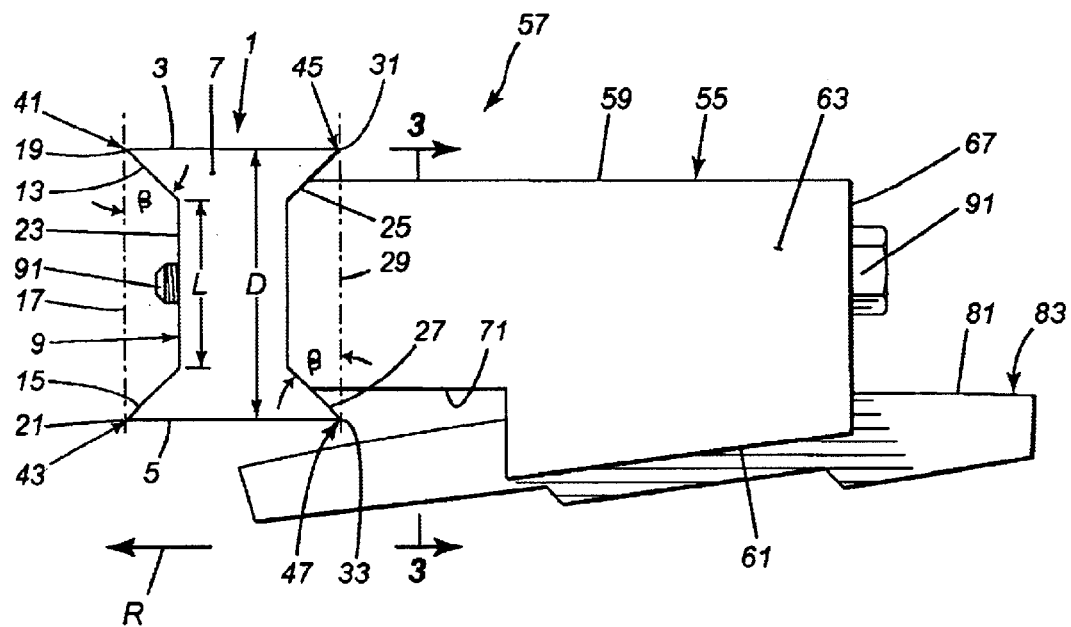
FIG. 1 is an exploded perspective view of the saw tooth assembly.
Figure 2:
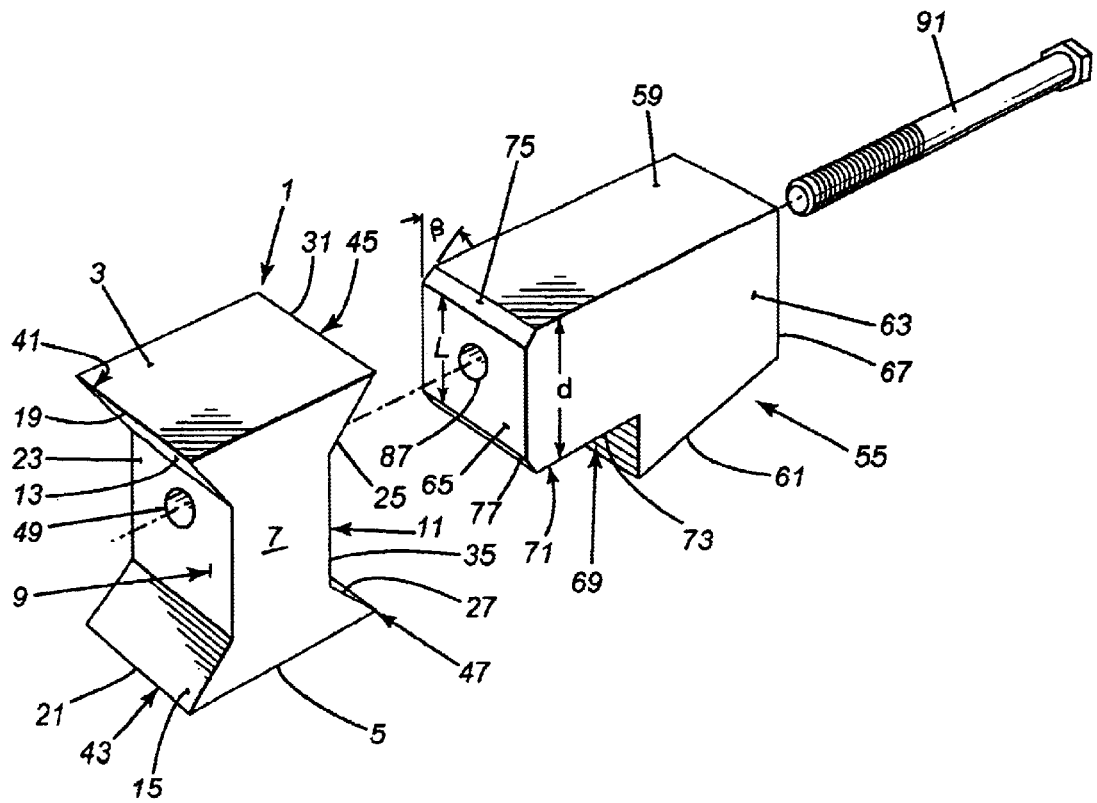
FIG. 2 is a side view of the saw tooth assembly mounted on a saw blade.

The saw tooth 1 of the present invention, as shown in FIGS. 1 and 2, has a generally parallelopiped shape with opposed top and bottom surfaces 3, 5; side surfaces 7; and front and back surfaces 9, 11. The top and bottom surfaces 3, 5 are preferably parallel and the sides 7 are also preferably parallel. The terms "top" and "bottom" refer to the location of the surfaces relative to a saw blade that the tooth is mounted on, the surface closest to the saw blade being the "bottom" surface. The terms "front" and "back" also refer to the location of the surfaces relative to a saw blade that the tooth is mounted on, the surface facing in the direction of rotation being the "front" surface.

The front surface 9 has front, top and bottom sections 13, 15 that extend inwardly away from a plane 17 joining the front sides 19, 21 of the top and bottom surfaces 3, 5, toward the back surface 11. The front, top and bottom sections 13, 15 of the front surface 9 are preferably angled inwardly at an angle β from the front plane 17 and are joined by a front, central section 23 that is transverse to the top and bottom surfaces 3, 5. Similarly, the back surface 11 has back, top and bottom sections 25, 27 that extend inwardly from a back plane 29 joining the back sides 31, 33 of the top and bottom surfaces 3, 5, toward the front surface 9. The back, top and bottom sections 25, 27 of the back surface 11 are preferably angled inwardly at an angle β from the back plane 29 and are joined by a back, central section 35 that is transverse to the top and bottom surfaces 3, 5. The angle β is approximately 45° but can vary between 20° and 65°. If desired, a small radius (not shown) can be formed at the juncture of the front, top and bottom sections 13, 15 with the front, central section 23 and at the juncture of the back, top and bottom sections 25, 27 with the back central section 35 to reduce stress.

The joining of the front, top section 13 of the front surface 9 to the top surface 3, at its front side 19, forms a first cutting edge 41. The joining of the front, bottom section 15 of the front surface 9 to the bottom surface 5, at its front side 21, forms a second cutting edge 43. The first and second cutting edges 41, 43 on the front surface 9 are parallel to each other and transverse to the side surfaces 7.

The joining of the back, top section 25 of the back surface 11 to the top surface 3, at its back side 31, forms a third cutting edge 45. The joining of the back, bottom section 27 of the back surface 11 to the bottom surface 5, at its back side 33, forms a fourth cutting edge 47. The third and fourth cutting edges 45, 47 are parallel to each other and transverse to the side surfaces 7. The third and fourth cutting edges 45, 47 are also parallel to the first and second cutting edges 41, 43. It will be seen that the front and back surfaces 9, 11 join the top and bottom surfaces 3, 5 at four parallel edge locations or corners with cutting edges 41, 43, 45, 47 formed at each of the corners.

The tooth 1 has a threaded, central, mounting hole 49 extending through the tooth between the central sections 23, 35 on the front and back surfaces 9, 11. The hole 49 is centrally located on the tooth between the top and bottom surfaces 3, 5 and is also centrally located between the side surfaces 7. The hole 49 extends transverse to the cutting edges 41, 43, 45, 47 and its center is equidistant from all of them.

Figure 3A:
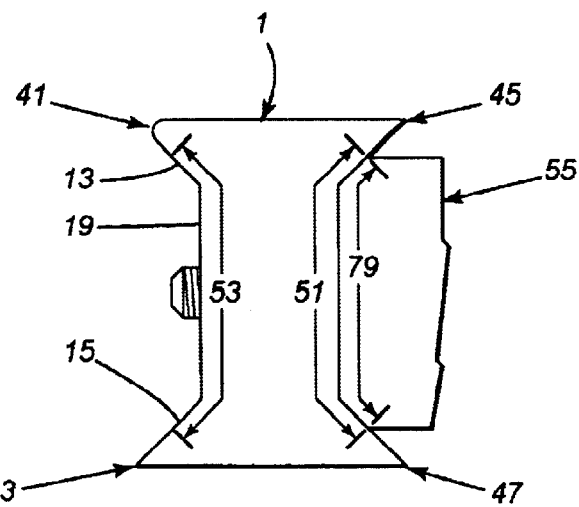
Figure 4:
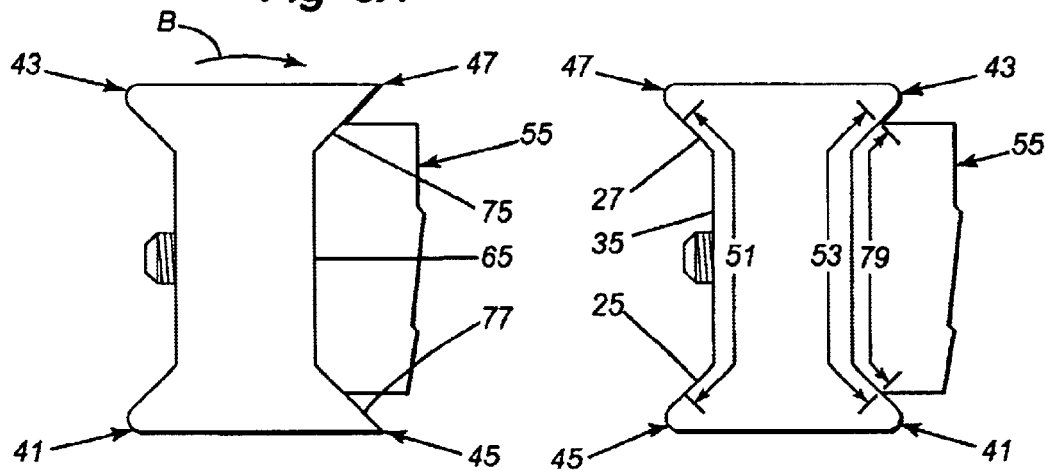
FIG. 4 is a cross-section view taken along line 4—4 in FIG. 1.
Figure 4:
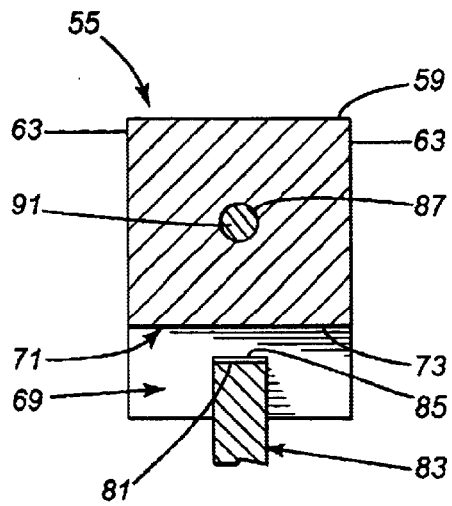

The back, central section 35 on the back surface 11 of the tooth together with adjacent portions of the top and bottom sections 25, 27 on the back surface 11 form a first mounting surface 51 for the tooth as shown in FIG. 3C and as will be described. The front, central section 23 on the front surface 9 together with adjacent portions of the top and bottom sections 13, 15 on the front surface 9 form a second mounting surface 53 for the tooth as shown in FIG. 3A and as will be described.

The saw tooth 1 is adapted to be mounted on a mounting block 55 to form a saw tooth assembly 57. The mounting block 55, as shown in FIGS. 1 and 2, has a top and a bottom surface 59, 61; side surfaces 63; and front and back surfaces 65, 67. The top and bottom surfaces 59, 61 converge slightly toward the back; the front and back surfaces 65, 67 are parallel; and the side surfaces 63 are also parallel. The front of the block 55 is under cut back from the front surface 65, as shown at 69, to produce a forwardly extending projection 71 having a bottom surface 73 that is parallel to the top surface 59.

The front of the projection 71 is beveled at the top and bottom as shown at 75, 77 at an angle β. The distance "L" between the beveled surfaces 75, 77 on the front surface 65 of the projection 71 is equal to the distance "L" between the top and bottom sections 13, 15 or 25, 27 on the front or back surfaces 9, 11 of the tooth 1. The depth "d" of the projection 71 is slightly less than the depth "D" of the tooth between its top and bottom surfaces 3, 5. The front surface 65 together with the beveled surfaces 75, 77 form a saw tooth mounting surface 79 as shown in FIG. 3.

The mounting block 55 is adapted to be mounted on the rim 81 of a circular saw 83, as shown in FIGS. 1 and 3. To this end, the bottom surface 61 of the block 55 has a longitudinal, central, groove 85 for receiving the rim 81. The block can be welded onto the rim or bolted on by bolts (not shown). The mounting block 55 also has a longitudinal mounting hole 87 that is centered on the front surface 65 of the projection 71 and extends transversely therefrom through the block.

With the mounting block 55 mounted on the rim of a saw 83, the saw tooth 1 is mounted on the block 55 by locating its first mounting surface 51 adjacent the mounting surface 79 on the projection 71 as shown in FIG. 3A. A bolt 91 is then passed through the longitudinal mounting hole 87 in the block and threaded into the threaded mounting hole 49 on the tooth 1. As the bolt 91 is tightened it draws the central section 35 of the back surface 11 of the tooth tight against the front surface 65 of the projection 71 and the back, end sections 25, 27 of the back surface 11 tight onto the beveled surfaces 75, 77. The beveled surfaces 75, 77 help to locate the tooth 1 on the projection 71 on the block 55. Thus the tooth 1 is locked onto the projection 71 with its first cutting edge 41 in the cutting position slightly above the block 55 and leading in the direction of rotation, as shown by the arrow "R", in FIG. 1. The undercut 69 on the block 55 provides clearance for the bottom portion of the tooth 1 from the rim 81 of the saw blade 83 when the tooth 1 is mounted on the projection 71.

When the first cutting edge 41 on the tooth 1 becomes dull, as shown in FIG. 3A, the bolt 91 is loosened and the tooth is rotated, to place the dull cutting edge on the bottom and the second, unused cutting edge 43, on the same front surface 9, on the top at the front. The bolt 91 is retightened. When the second cutting edge 43 becomes dull, the bolt 91 is loosened and removed and the tooth is turned around, as shown by the arrow "B" in FIG. 3B to put its back surface 11 at the front. The tooth is then remounted on the block 55 with the bolt 91 with its second mounting surface 53 adjacent the mounting surface 79 on the projection 71 as shown in FIG. 3C. The fourth cutting edge 47 is at the front and top of the block 55. When this fourth cutting edge 47 becomes dull, the bolt 91 is again loosened and the tooth is once again rotated, to place the third cutting edge 45 on the top and in front of the block 55, still with the second mounting surface 53 on the tooth adjacent the mounting surface 79 on the block.

It will be seen that the improved saw tooth is easily and correctly mounted on the saw, through the mounting block, and also easily manipulated to locate any one of four cutting edges in the proper cutting position.

Figure 5:
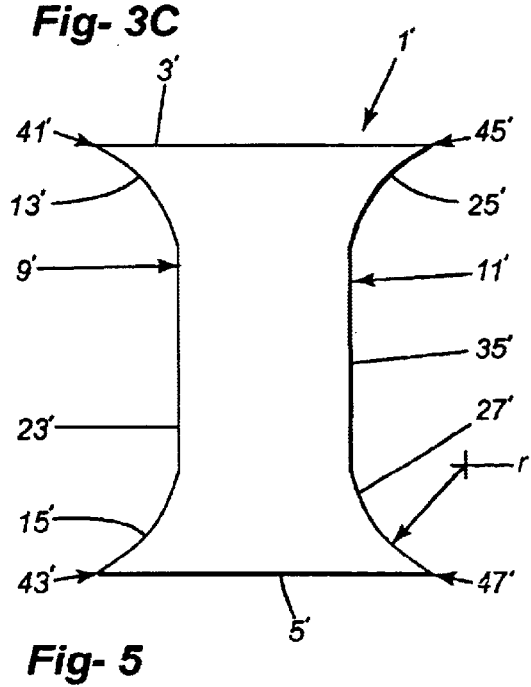
FIG. 5 is a side view of another embodiment of the saw tooth.

While the cutting edges on the saw tooth have been shown to be formed by straight, angled surfaces on the front and back surfaces joining the top and bottom surfaces, they could also be formed with curved surfaces on the front and back surfaces joining the top and bottom surfaces. As shown in FIG. 5, a saw tooth 1' can be provided having front and back surfaces 9', 11' with concavely curved top and bottom sections 13', 15' and 25', 27' respectively. The front, curved, top and bottom sections 13', 15' merge smoothly with the straight, front central section 23' and the back, curved, top and bottom sections 25', 27' merge smoothly with the straight, back, central section 35'. The juncture of the front, top and bottom sections 13', 15, with the top and bottom surfaces 3', 5', produce straight cutting edges 41', 43' and the juncture of the back, top and bottom sections 25', 27' with the top and bottom surfaces 3', 5' produce straight cutting edges 45', 47'. The top and bottom sections 13', 15' and 25', 27, can be curved along a radius "r" of suitable length.

If the tooth employs curved surfaces to form the cutting edges, then the projection also employs similar, complementary curved surfaces in place of the beveled surfaces in order to properly mount the tooth on the block.

Figure 6:
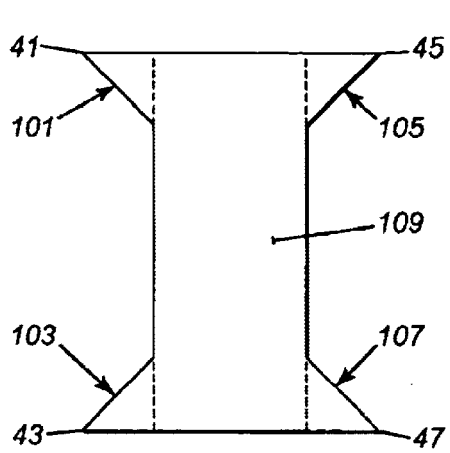
FIG. 6 is a side view of the saw tooth.
Figure 7A:
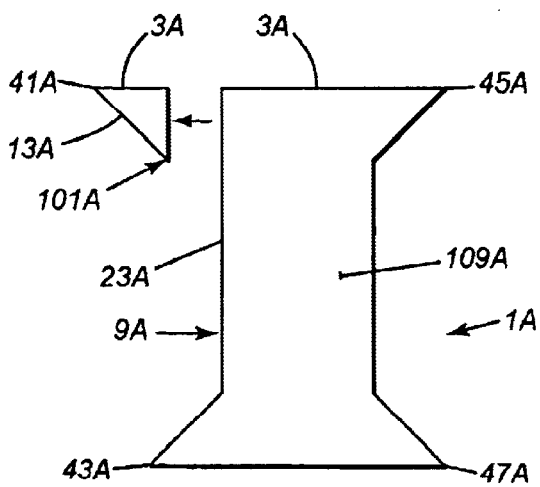
FIGS. 7A to 7D are side views of variations of the saw tooth.

The tooth 1 has been shown with four parallel cutting edges 41, 43, 45, 47 and such a tooth is the most cost effective to manufacture and use. However, the tooth can be made with fewer cutting edges if desired. FIG. 6 shows the tooth 1 in side view with triangular sections 101, 103, 105 and 107 extending from the main body 109, a square parallelepiped, of the tooth. The triangular sections define the material of the tooth 1 used to define the cutting edges 41, 43, 45, 47. In one embodiment, one of the triangular sections 101A of the tooth 1A can be removed from the main body 109A of the tooth eliminating one of the cutting edges 41A as shown in FIG. 7A. The front, central section 23A of the front surface 9A is extended upwardly in this embodiment with front, top section 13A and a portion of the top surface 3A being eliminated. The tooth 1A is left with three cutting edges 43A, 45A, 47A in this embodiment. While cutting edge 41A was shown eliminated, any one of the other three cutting edges could be eliminated instead by removing the triangular portion associated with it.

Figure 7B:
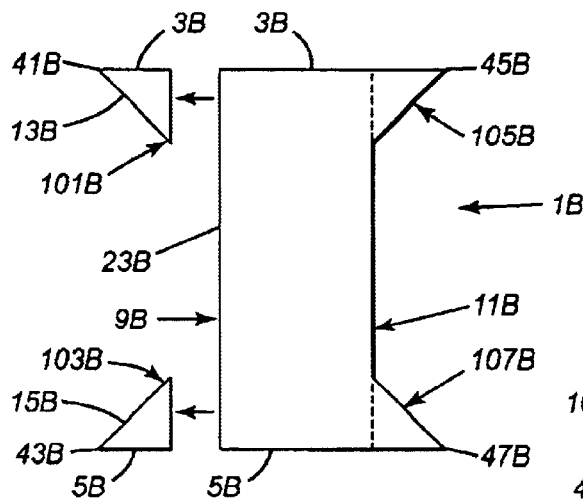

In another embodiment, the tooth 1 can be modified by removing two triangular sections thereby eliminating two cutting edges from the tooth and leaving it with two cutting edges. In one variation, shown in FIG. 7B, the tooth 1B as two triangular sections 101B, 103B removed from the same side of the tooth removing two cutting edges 41B, 43B from the same side. The front, central section 23B of the front surface 91 is extended top and bottom removing the triangular sections 101B, 103B and eliminating the front, top and bottom sections 13B, 15B and front portions of the top and bottom surfaces 3B, 5B. This tooth 1B is left with two cutting edges 45B, 47B on the same or back surface of the tooth. The tooth could instead have the two triangular portions 105B, 107B removed from the back surface 11B leaving the tooth with two cutting edges 41B, 43B on the front surface 9B.

Figure 7C:
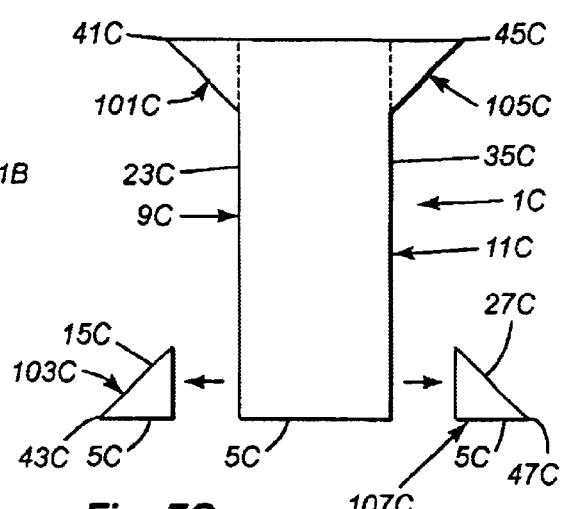

In another variation, the tooth 1 can be modified by removing the two bottom triangular portions 103C, 107C as shown in FIG. 7C leaving a tooth 1C with two cutting edges 41C, 45C at the top of the tooth. In this embodiment both the front and back central sections 23C, 35C of the front and back surfaces 9C, 11C are extended downwardly to remove the front bottom and back bottom sections 15C, 27C of the front and back surfaces 9C, 11C and the front and back portions of the bottom surface 5C of the tooth. The tooth could instead have the two top triangular portions 101C, 105C removed to provide the same kind of tooth.

Figure 7D:
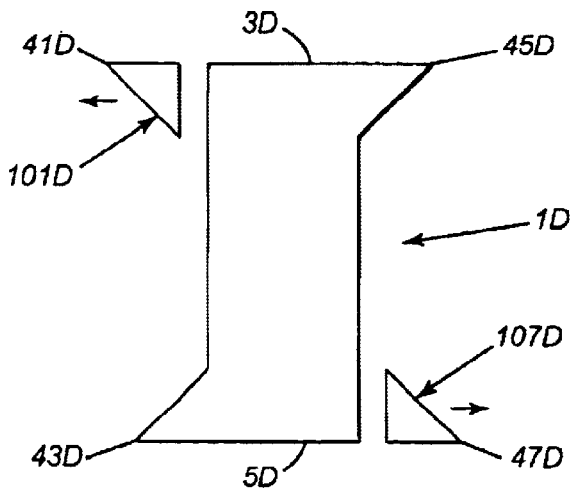

In yet another variation, a triangular portion 101D on one side on the top surface 3D could be removed and a triangular portion 107D on the opposite side on the bottom surface 5D could be removed eliminating cutting edges 41D, 47D as shown in FIG. 7D. This would leave a tooth 1D having two cutting edges 43D, 45D on opposite sides of the tooth with one at the top and one at the bottom.

Each tooth embodiment, with less than four cutting edges, still has the central mounting hole 49 for mounting the tooth, with the aid of the triangular sections, where they remain, on the mounting block. While the teeth with less than four cutting edges have been described with angled front and rear surfaces, they could also have concavely curved front and rear surfaces.

I claim:

1. A saw tooth having:

a rectangular top surface and a rectangular bottom surface, the top and bottom surfaces parallel;

parallel, continuous, side surfaces extending between the top and bottom surfaces;

front and back surfaces extending between the top and bottom surfaces;

the front surface extending inwardly toward the back surface from the top and bottom surfaces to provide an inwardly dished front surface;

the front surface forming, with its connection to the top and bottom surfaces, front, top and bottom cutting edges respectively;

the back surface extending inwardly toward the front surface from the top and bottom surfaces to provide an inwardly dished back surface;

the back surface forming, with its connection to the top and bottom surfaces, back, top and bottom cutting edges respectively;

the back surface being identical to the front surface but reversed one hundred and eighty degrees to the front surface; and a mounting opening extending between the front and back surfaces, the opening located midway between the top and bottom surfaces, midway between the side surfaces, and transverse to the cutting edges.

2. A saw tooth as claimed in claim 1 wherein the front and back top cutting edges are parallel and the bottom front and back cutting edges are parallel.

3. A saw tooth as claimed in claim 1 wherein the front surface has front, top and bottom sections, the front top and bottom sections extending from the front, top and bottom edges respectively; and the back surface has back, top and bottom sections, the back, top and bottom sections extending from the back, top and bottom edges respectively.

4. A saw tooth as claimed in claim 3 wherein the top and bottom sections on both the front and back surfaces are curved concavely inwardly from the top and bottom edges.

5. A saw tooth as claimed in claim 3 wherein the front and back top and bottom sections on both the front and back surfaces are angled inwardly from the front and back edges at an angle to an imaginary plane joining the front edges and an imaginary plane joining the back edges, of between twenty degrees and sixty degrees.

6. A saw tooth as claimed in claim 3 wherein the front and back top and bottom sections on both the front and back surfaces are angled inwardly from the front and back edges at an angle to an imaginary plane joining the front edges and an imaginary plane, joining the back edges, of about forty five degrees.

7. A saw tooth as claimed in claim 3 wherein the front top and bottom sections on the front surface are joined by a central section, and the back top and bottom sections on the back surface are joined by a central section, the central section bieng parallel and transverse to the top and bottom surfaces.

8. A saw tooth as claimed in claim 1 wherein a central portion of the front surface forms a first mounting surface for mounting the tooth on a mounting block in a first position and a central portion of the back surface forms a second mounting surface for mounting the tooth on the mounting block in a second position.

9. A saw tooth having:
   a rectangular top surface and a rectangular bottom surface, the top and bottom surfaces parallel;
   side surfaces;
   and front and back surfaces;
   the front surface extending between the top and bottom surfaces and extending inwardly from the top and bottom surfaces toward the back surface to provide an inwardly dished front surface;
   the front surface forming, with its connection to the top and bottom surfaces, front, top and bottom cutting edges;
   the back surface extending between the top and bottom surfaces and extending inwardly from the top and bottom surfaces toward the front surface to provide an inwardly dished back surface;
   the back surface forming, with its connection to the top and bottom surfaces, back, top and bottom cutting edges;
   the front, top and bottom cutting edges parallel to each other; the back top and bottom cutting edges parallel to each other, and the front cutting edges parallel to the back cutting edges, and
   a mounting opening extending between the front and back surfaces, the opening located midway between the top and bottom surfaces, midway between the side surfaces, and transverse to the cutting edges.

10. A saw tooth as claimed in claim 9 wherein a central portion of the front surface forms a first mounting surface for use in mounting the saw tooth in a first position on a mounting block, and a central portion of the back surface forms a second mounting surface for use in mounting the saw tooth in a second position on the mounting block.

11. A saw tooth assembly having:
    a saw tooth, the saw tooth having:
       a rectangular top surface and a rectangular bottom surface, the top and bottom surfaces parallel;
       side surfaces;
       and front and back surfaces;
       the front surface extending between the top and bottom surfaces and extending inwardly from its connection to the top and bottom surfaces toward the back surface to provide an inwardly dished front surface;
       the front surface forming, with its connection to the top and bottom surfaces, front, top and bottom cutting edges;
       the back surface extending between the top and bottom surfaces and extending inwardly from its connection to the top and bottom surfaces toward the front surface to provide an inwardly dished back surface;
       the back surface forming with its connection to the top and bottom surfaces back, top and bottom cutting edges;
       the front, top and bottom cutting edges parallel to each other; the back top and bottom cutting edges parallel to each other, and the front cutting edges parallel to the back cutting edges;
    the front and back surfaces of the saw tooth each having a mounting surface section to be able to locate any one of the four cutting edges in cutting position when the saw tooth is detachably mounted on a mounting block, each mounting surface section centrally positioned between the top and bottom surfaces;
    a mounting block;
       mounting means on the mounting block for use in mounting the block on the rim of a circular saw blade;
       a mounting surface on the mounting block;
       and a bolt detachably connecting the tooth to the block with the mounting surface on the block abutting one of the mounting surface sections on the front and back surfaces of the tooth.

12. A saw tooth assembly as claimed in claim 11 wherein the mounting block has a leading projection with a front surface; the mounting surface on the block located adjacent the front surface of the projection; and a through mounting hole on the block for the bolt extending centrally through the projection, the projection having a height slightly less than the height of the tooth.

13. A saw tooth assembly as claimed in claim 12 wherein the top and bottom of the front surface of the projection is beveled to provide beveled surfaces.

14. A mounting assembly as claimed in claim 13 wherein the front and back surfaces of the saw tooth each have a central vertical section and angled top and bottom sections; portions of the angled sections, together with the central section, on each of the front and back surfaces froming the two mounting surface sections on the tooth, the portions of the angled sections abutting on the beveled surfaces of the projection on the block to center and hold the tooth on the block.

15. A saw tooth assembly as claimed in claim 11 wherein the inwardly extending front and back surfaces of the saw tooth each have a central vertical section and angled top and bottom sections; a portion of the angled sections, together with the central section, on each of the front and back surfaces forming the two mounting surface sections on the tooth.

16. A saw tooth assembly as claimed in claim 11 wherein the inwardly extending front and back surfaces of the saw tooth each have a central vertical section and concavely curved top and bottom sections; a portion of the curved sections, together with the central section, on each of the front and back surfaces forming the two mounting surface sections on the tooth.

17. A saw tooth of generally square parallelepiped shape having parallel top and bottom surfaces; parallel side surfaces; and front and back surfaces, the front and back surfaces having end sections adjacent the top and bottom surfaces; at least two end sections of the front and back surfaces extending inwardly, from the connection of each end section with its associated top or bottom surfaces, toward the other of the front and back surfaces; each end section defining a cutting edge with its connection with one of the top and bottom surfaces; the cutting edges parallel to each other; and a central mounting hole extending between the front and back surfaces, the hole transverse to the cutting edges.

18. A saw tooth as claimed in claim 17 wherein one of the top end section of the front and back surfaces and the bottom end section of the front and back surfaces extend inwardly to define two cutting edges at one of the top and bottom surfaces.

19. A saw tooth as claimed in claim 17 wherein one of the top and bottom end sections of the front surface and the top and bottom end sections of the back surface extend inwardly to define two cutting edges at the top and bottom of one of the front and back surfaces.

20. A saw tooth as claimed in claim 17 wherein one of the top and bottom end sections of the front surface and the other of the top and bottom end sections of the back surface extend inwardly to define two cutting edges, one at the top on one side and the other at the bottom on the other side.

21. A saw tooth as claimed in claim 17 wherein three end sections of the front and back surfaces extend inwardly toward the other of the front and back surfaces to define three cutting edges.

22. A saw tooth as claimed in claim 17 wherein all four end sections of the front and back surfaces extend inwardly toward the other of the front and back surfaces to define four cutting edges.

* * * * *